United States Patent [19]

Yoshino et al.

[11] 4,337,651

[45] Jul. 6, 1982

[54] APPARATUS FOR MEASURING AND INDICATING BRAKING VEHICLE SPEEDS

[75] Inventors: Yasuhisa Yoshino, Okazaki; Akira Kuno, Oobu; Hidetoshi Shimizu; Harumasa Minegishi, both of Susono, all of Japan

[73] Assignees: Nippon Soken, Inc., Nishio; Toyota Jidosha Kogyo Kabushiki Kaisha, Toyota, both of Japan

[21] Appl. No.: 209,421

[22] Filed: Nov. 24, 1980

[30] Foreign Application Priority Data

Dec. 6, 1979 [JP] Japan ............................... 54-169435

[51] Int. Cl.³ ............................................. G01L 5/28

[52] U.S. Cl. ...................................... 73/129; 364/426

[58] Field of Search ................. 73/121, 129, 495, 509; 364/426; 303/93, 103

[56] References Cited

U.S. PATENT DOCUMENTS

| | | | |
|---|---|---|---|
| 2,340,403 | 2/1944 | Morley et al. | 73/129 |
| 3,943,345 | 3/1976 | Ando et al. | 364/426 |

*Primary Examiner*—James J. Gill

*Attorney, Agent, or Firm*—Cushman, Darby & Cushman

[57] ABSTRACT

An apparatus measures and indicates the speeds of a vehicle at the beginning and end of braking of the vehicle by counting as many vehicle speed representative pulse signals as indicative of the speed per hour of the vehicle which are gated during the time that the desired number of clock pulses are counted in response to the beginning and end of braking of the vehicle, respectively.

7 Claims, 6 Drawing Figures

APPARATUS FOR MEASURING AND INDICATING BRAKING VEHICLE SPEEDS

BACKGROUND OF THE INVENTION

The present invention relates to a braking vehicle speed measuring apparatus for measuring the initial and final braking speeds of a vehicle under braking.

Known systems for measuring the initial braking speed of a vehicle during the initial braking period and the final braking speed upon completion of the braking have been such that at the beginning and end of the braking action the measure reads the vehicle speeds by means of the speedometer attached to the vehicle or alternatively the measurements are made by such means as a fifth wheel attached to the vehicle exclusively for vehicle speed measuring purposes. Another system has been proposed in which the output of a vehicle speed sensor designed to generate a number of pulses proportional to the vehicle speed is subjected to digital-to-analog conversion and then recorded in a data recorder or the like and at the same time the initial and final braking speeds are obtained from the marked beginning and end of the braking action.

However, these known systems have the disadvantages of being low in measuring accuracy, requiring the attachment to a vehicle of such large means as a fifth wheel, being unable to easily measure the braking vehicle speed of a vehicle, etc.

SUMMARY OF THE INVENTION

With a view to overcoming the foregoing deficiencies in the prior art, it is the object of the present invention to provide an improved braking vehicle speed measuring apparatus in which while the speed of a vehicle is measured at predetermined intervals irrespective of braking of the vehicle, noting the fact that the vehicle speed does not change rapidly due to the inertia of the vehicle, the vehicle speed just before the beginning of braking is detected as the initial braking speed and the vehicle speed just after the completion of the braking is detected as the final braking speed and which is thus easily attachable to any types of vehicles, excellent in accuracy and compact in construction.

DESCRIPTION OF THE PREFERRED EMBODIMENT

The present invention will now be described in greater detail with reference to the illustrated embodiment.

Figure 1:
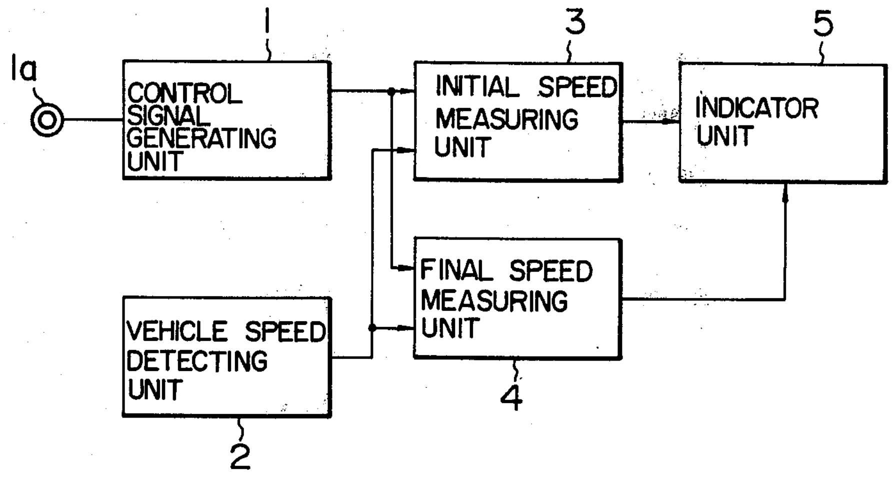
FIG. 1 is a block diagram showing the overall construction of an embodiment of the present invention.

Referring to FIG. 1 illustrating the overall construction of the embodiment, numeral 1 designates a control signal generating unit for receiving at its terminal 1*a* the ON or OFF signal of a brake switch operatively associated with the brakes of a vehicle so as to detect braking of the vehicle and generate control signals for suitably operating the various units. Numeral 2 designates a vehicle speed detecting unit for generating a number of pulse signals proportional to the speed of the vehicle, 3 an initial speed measuring unit for measuring the vehicle speed at predetermined intervals irrespective of the presence or absence of the braking and memorizing the vehicle speed just before the beginning of the braking in response to a control signal from the control signal generating unit 1, and 4 a final speed measuring unit for measuring the final braking speed in response to a control signal applied from the control signal generating unit 1 in a predetermined time interval just following the completion of the braking. Numeral 5 designates an indicator unit for digitally indicating the measurements of the initial speed measuring unit 3 and the final speed measuring unit 4.

Figure 2:
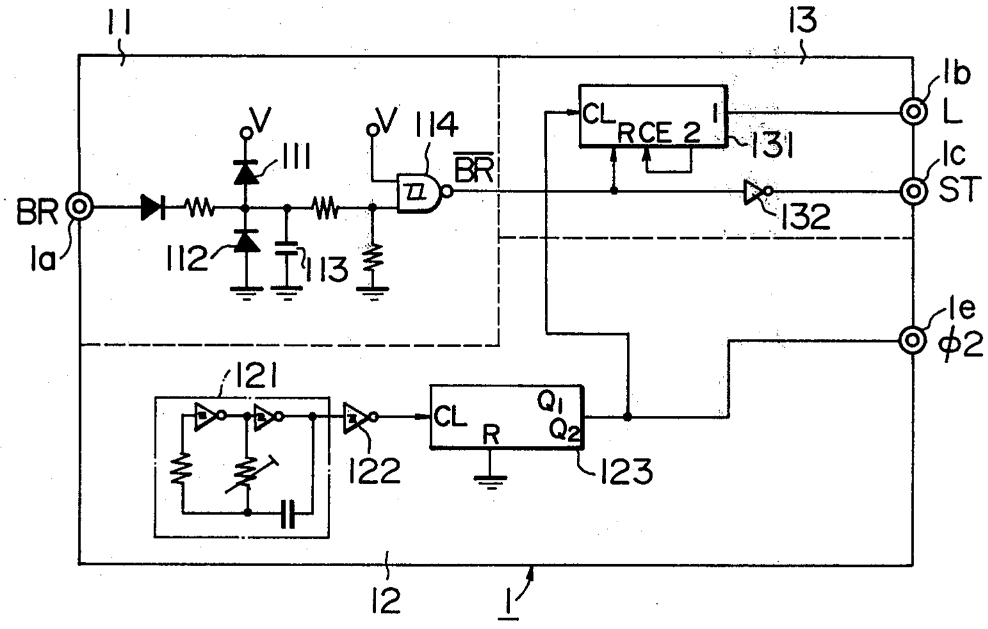
FIG. 2 is a circuit diagram of the control signal generating unit shown in FIG. 1.

The operation as well as the circuit construction of the various units of FIG. 1 will now be described with reference to their detailed circuit diagrams shown in FIGS. 2 to 6. Referring to FIG. 2 showing the control signal generating unit 1, the wiring cable interconnecting the brake switch and the brake warning light of the vehicle is extended and connected to the terminal 1*a*. As a result, when the brakes are applied, the vehicle battery voltage is applied to the terminal 1*a* and the voltage is hereinafter referred to as a brake signal $\overline{BR}$. Numeral 11 designates a limiter and waveform reshaping circuit for the brake signal, which comprises clipper diodes 111 and 112, a noise absorbing capacitor 113, a NAND gate 114 which exhibits hysteresis to prevent generation of noise due to chattering of the switch, etc. The output signal of the NAND gate 114 is designated as BR. Numeral 12 designates a clock signal generating circuit comprising a CR oscillator 121, a waveform reshaping NAND gate 122 which exhibits hysteresis and a frequency divider 123 employing the known TOSHIBA IC TC4040, thus generating a clock signal $\phi_2$ of about 1 KHz at a terminal 1*e* connected to the $Q_2$ terminal of the frequency divider 123. Numeral 13 designates a control circuit responsive to the output of the brake signal limiter and waveform reshaping circuit 11 and the clock signals $\phi_2$ to generate an initial speed latch signal L at a terminal 1*b* and a final speed measurement start signal ST at a terminal 1*c* and it comprises a latch signal generating circuit 131 and an inverter 132. When the brake signal BR is applied to the terminal 1*a*, the signal BR goes to a "0" level. This releases the resetting of the latch signal generating circuit 131 of the control circuit 13 so that an initial speed latch signal L is generated from its first stage 1 and then its second stage 2 goes to a "1" level, thus causing its clock enable terminal CE connected to the second stage to go to the "1" level and thereby completing a series of operations. The inverter 132 inverts the signal $\overline{BR}$ and the resulting signal is delivered as a final speed measurement start signal ST.

Figure 3:
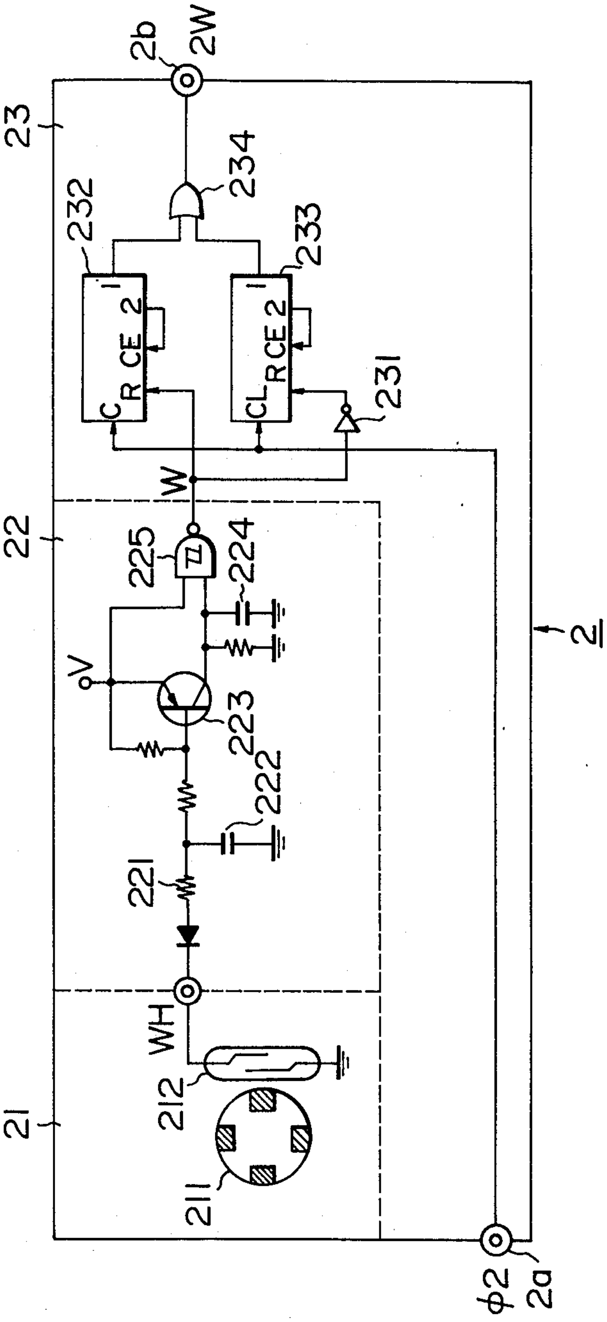
FIG. 3 is a circuit diagram of the vehicle speed detecting unit shown in FIG. 1.

In FIG. 3 showing the vehicle speed detecting unit 2, numeral 21 designates a vehicle speed sensor including a magnet 211 connected to the speedometer cable shaft and a reed switch 212 for generating four pulse signals WH for every revolution of the magnet 211, and 22 a reshaping circuit for reshaping the signal from the vehicle speed sensor 21 and it comprises a resistor 221, a noise absorbing capacitor 222, a transistor 223, a noise absorbing capacitor 224 and a NAND gate 225 which exhibits hysteresis to prevent generation of noise due to chattering of the switch. The resulting output signal W represents the reshaped vehicle speed signal. Numeral 23 designates a frequency multiplier circuit for receiving the vehicle speed signal W and the clock signals $\phi_2$ at its terminal *2a* to generate at its terminal *2b* a pulse signal 2W of a frequency which is two times that of the signal W, and it comprises an inverter 231, counters 232 and 233 each employing the known TOSHIBA IC TC4017 and an OR gate 234.

Figure 4:
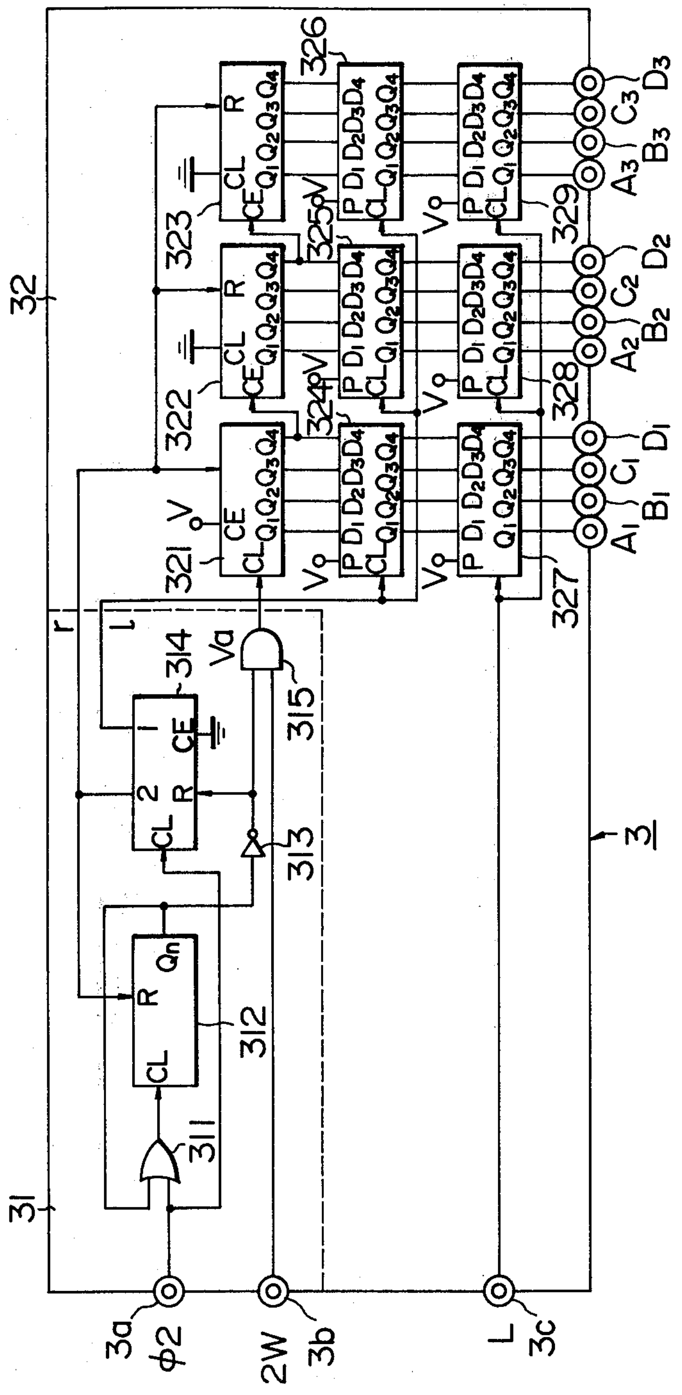
FIG. 4 is a circuit diagram of the initial speed measuring unit shown in FIG. 1.

In FIG. 4 showing the initial speed measuring unit 3, numeral 31 designates an initial speed gating signal generating circuit comprising an OR gate 311, a counter 312 employing the TOSHIBA IC TC4040, an inverter 313, a decade counter 314 employing the TC4017 and an AND gate 315. Assuming now that the output $Q_n$ of the counter 312 goes to the "1" level at a certain time, the output of the OR gate 311 connected to the output $Q_n$ goes to the "1" level and thereafter the application of the clock signals $\phi_2$ to the clock terminal CL is prevented until a "1" level signal is applied to the reset terminal R and the output $Q_n$ goes again to the "0" level. When the output $Q_n$ of the counter 312 goes to the "1" level, the inverter 313 connected to the output $Q_n$ generates a "0" level output. As a result, the resetting of the decade counter 314 is released so that in response to the clock signals $\phi_2$ applied through a terminal *3a*, a single pulse signal is generated from each of its first and second stages 1 and 2. The output of the first stage 1 is a latch signal l and the output of the second stage 2 is a reset signal r. Since the second stage 2 of the counter 314 is connected to the reset terminal R of the counter 312, when the reset signal r is generated, the counter 312 is reset so that its output $Q_n$ goes to the "0" level and the OR gate 311 is opened, thus allowing the application of the clock signals $\phi_2$ to the counter 312. Then the output $Q_n$ again goes to the "1" level at a certain later time and thereafter the previously mentioned operations are repeated. The interval between the time that the output $Q_n$ goes to the "0" level and the time that the output $Q_n$ goes to the "1" level or the time interval during which the output of the inverter 313 is held at the "1" level is determined by the oscillation frequency of the CR oscillator 121. In this case, the oscillation frequency is selected to become 706 msec in accordance with the following calculation. When the vehicle is running at 60-Km/h, the speedometer cable shaft is rotated at 637 rpm and the frequency of the vehicle speed signal W is given by $$\frac{637\text{ rpm} \times 4}{60\text{ sec}} = 42.46\text{ Hz.}$$

This frequency is increased by two times so that the frequency of the signal 2W applied to the terminal *3b* becomes 84.92 Hz and thus $$\frac{60}{84.92} = 0.706\text{ (sec)}$$

is required for counting the signals so as to give "60" (corresponding to the vehicle speed in terms of Km/h). As a result, the output of the inverter 313 is maintained at the "1" level for 706 msec during which the AND gate 315 is opened to pass 60 pulse signals applied through the terminal *3b*. The output of the AND gate 315 represents an initial speed data $V_a$.

Numeral 32 designates an initial speed counting circuit for counting and latching the initial speed data $V_a$ and it comprises BCD counters 321, 322 and 323 each using the TOSHIBA IC TC4518 and data latches 324, 325, 326, 327, 328 and 329 each using the TC4042. The data latches 324, 325 and 326 are responsive to the latch signal l to latch the contents of the BCD counters at intervals of 706 msec irrespective of the brake signal, and the data latches 327, 328 and 329 latch the contents of the data latches 324, 325 and 326 in response to the initial speed latch signal L which is applied to a terminal *3c* after the application of the brake signal. The thus latched data represents the initial braking speed. The outputs of the data latches 327, 328 and 329 represent three BCD digits at output terminals $A_1$ to $D_1$, $A_2$ to $D_2$ and $A_3$ to $D_3$, respectively, with the $A_1$ to $D_1$ representing the least significant digit.

Figure 5:
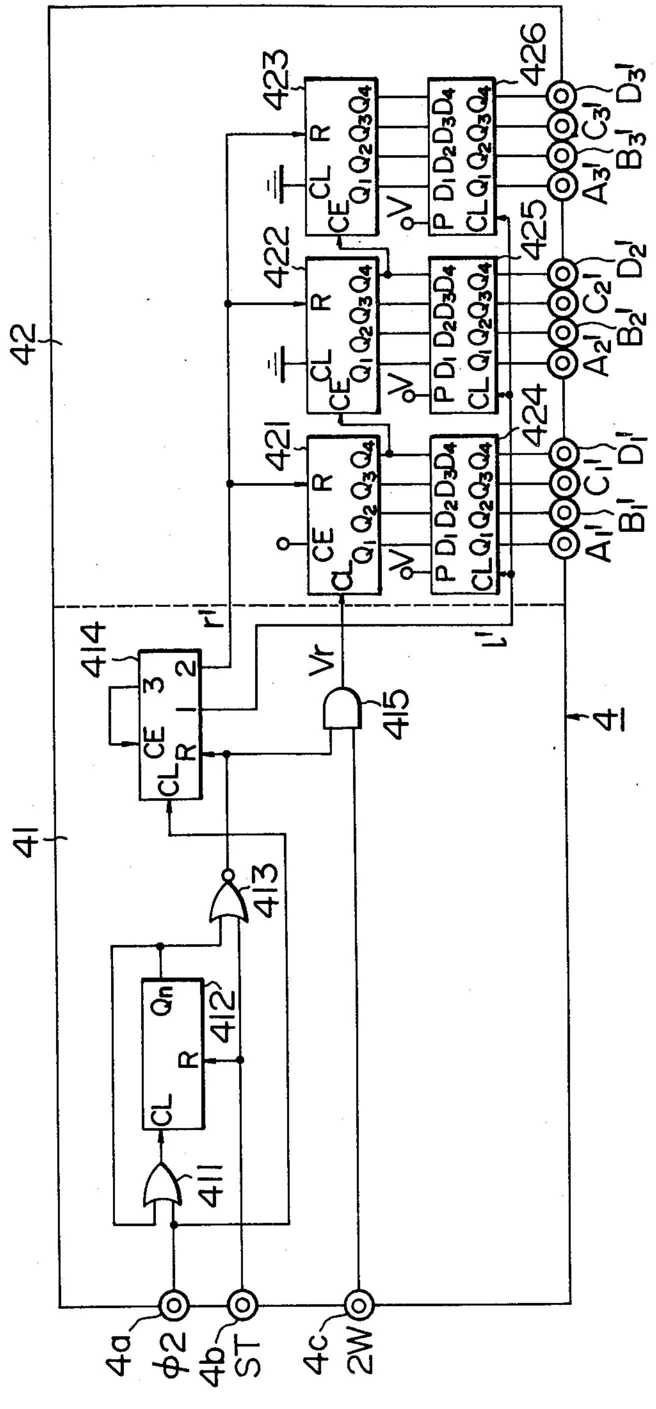
FIG. 5 is a circuit diagram of the final speed measuring unit shown in FIG. 1.

In FIG. 5 showing the final speed measuring unit 4, numeral 41 designates a final speed gating signal generating circuit comprising an OR gate 411, a counter 412 using the TOSHIBA IC TC4040, a NOR gate 413, a decade counter 414 using the TC4017 and an AND gate 415. Assume now that the brakes are applied at a certain time and are released at a later time. In response to the application of the brakes, the final speed measurement start signal ST applied to a terminal *4b* goes to the "1" level and the output $Q_n$ of the counter 412 goes to the "0" level. In response to the releasing of the brakes the signal ST goes to the "0" level so that the resetting of the counter 412 is released and the counter 412 starts to count the clock signals $\phi_2$ applied through a terminal *4a* and the OR gate 411. At this time, the two inputs of the NOR gate 413 are at the "0" level so that the reset terminal R of the decade counter 414 is at the "1" level and the counter 414 is not in operation. In the like manner as the initial speed measuring unit 3, after the expiration of 706 msec the output $Q_n$ of the counter 412 goes to the "1" level so that the resetting of the decade counter 414 is released and the counter 414 generates a latch signal l' and a reset signal r'. When the output $Q_n$ goes to the "1" level, the counter 412 stops counting. A final speed data $V_r$ represents the signals 2W applied to a terminal *4c* and passed during the interval of 706 msec. Numeral 42 designates a final speed counter circuit for counting and latching the final speed data $V_r$ and it comprises BCD counters 421, 422 and 423 each using the TOSHIBA IC TC4518 and data latches 424, 425 and 426 each using the TC4042. The data $V_r$ is counted by the BCD counters 421, 422 and 423 and then latched in the data latches 424, 425 and 426 in response to the latch signal l'. The contents of the BCD counters are reset in response to the reset signal r'. The outputs of the data latches 424, 425 and 426 represent three BCD digits at output terminals $A'_1$ to $D'_1$, $A_2'$ to $D_2'$ and $A_3'$ to $D_3'$, respectively, with the $A_1'$ to $D_1'$ representing the least significant digit.

Figure 6:
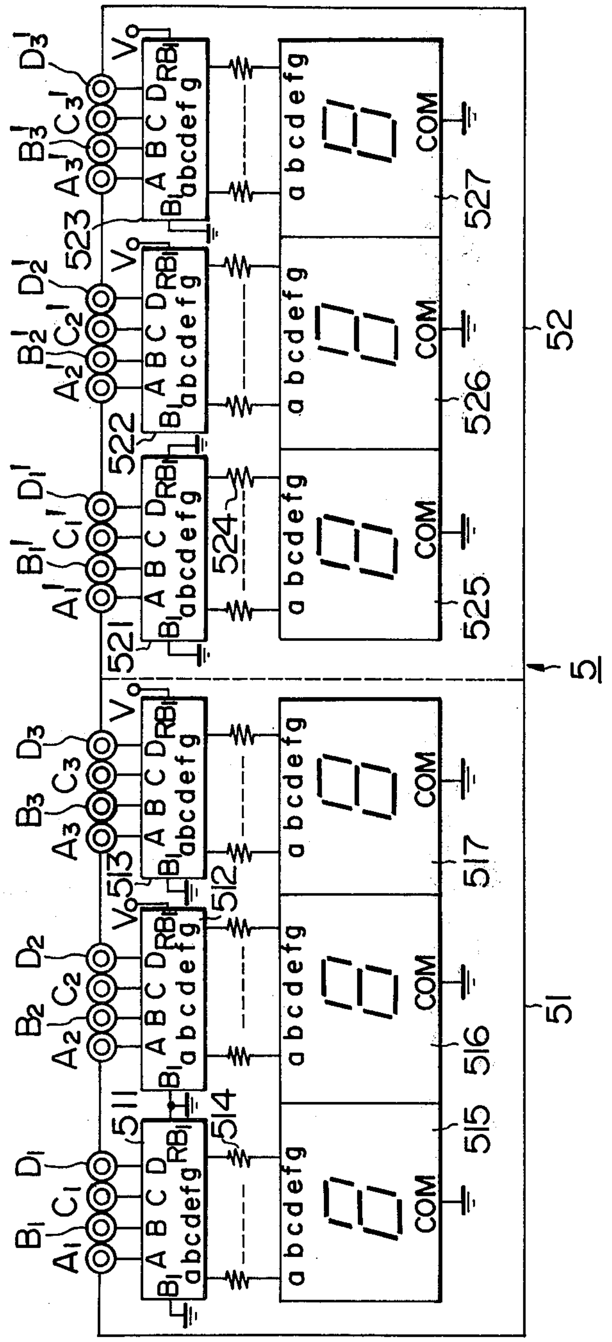
FIG. 6 is a circuit diagram of the indicator unit shown in FIG. 1.

In FIG. 6 showing the indicator unit, numeral 51 designates an initial speed indicating circuit, and 52 a final speed indicating circuit. The circuits 51 and 52 respectively comprise decoders 511, 512, 513 and 521, 522, 523 each using the TOSHIBA IC5002, current limiting resistors 514 and 524 (each $7\times3=21$) and displays 515, 516, 517 and 525, 526, 527 each employing the TOSHIBA LED TLR-312. The BCD outputs of the initial speed measuring unit 3 and the final speed measuring unit 4 are converted by the decoders 511, 512, 513, 521, 522 and 523 to 7-segment signals which are in turn digitally displayed by the displays.

While, in the embodiment described above, the vehicle speed is indicated digitally by the digital displays, the vehicle speed may be indicated analogically on a meter through D/A conversion or the vehicle speed may be measured in the form of an output which can be recorded on a pen recorder or the like.

Further, while the presence or absence of braking is determined in accordance with the output signal of the brake switch, if the presence of braking is determined in dependence on the presence of an acceleration greater than a predetermined value, the application of the brakes may be sensed by a G sensor or acceleration sensor to use its output signal in place of the brake signal used in the above-described embodiment.

Further, it is possible to add a device for calculating an approximate braking energy in accordance with the initial and final braking speeds detected by the apparatus of this invention.

Still further, while, in the above-described embodiment, the vehicle speed sensor used generates four pulses per revolution, it is possible to replace it with one which generates a greater number of pulses so as to further improve the accuracy and decrease the vehicle speed measuring time.

It will thus be seen from the foregoing detailed description that the apparatus of this invention has a great advantage that the speed of a vehicle is measured at predetermined intervals irrespective of braking of the vehicle so that the vehicle speed just before the beginning of braking is detected as the initial braking speed and the vehicle speed just after the completion of the braking is detected as the final braking speed, thus making it possible to detect both the initial and final braking speeds with a very high degree of accuracy, making it possible to easily mount the apparatus and making the apparatus itself compact in construction.

We claim:

1. A braking vehicle speed measuring apparatus comprising:

vehicle speed detecting means for generating a number of vehicle speed pulse signals proportional to the speed of a vehicle;

control signal generating means for detecting the start and end of braking of said vehicle and generating a start-of-braking indication control signal and an end-of-braking indication control signal;

initial speed measuring means for measuring the speed of said vehicle at predetermined intervals irrespective of braking of said vehicle, said initial speed measuring means being responsive to said start-of-braking indication control signal to store the speed of said vehicle just before said start of braking; and final speed measuring means responsive to said end-of-braking indication control signal to measure the speed of said vehicle just after said end of braking.

2. An apparatus according to claim 1, further comprising indicator means for indicating said vehicle speed just after the start of braking and said vehicle speed just after the end of braking.

3. An apparatus according to claim 1, wherein said control signal generating means includes:

means operatively connected to brakes of said vehicle for detecting the start and end of braking of said vehicle;

a clock signal generating circuit for generating a clock frequency signal;

first latch circuit means responsive to said clock frequency signal and the start of braking of said vehicle to generate said start-of-braking indication control signal for a predetermined time interval; and a circuit responsive to the end of braking of said vehicle for generating said end-of-braking indication control signal.

4. An apparatus according to claim 3, wherein said vehicle speed detecting means includes:

a circuit for generating first vehicle speed signals of a frequency proportional to the rotational speed of said vehicle; and a frequency multiplier circuit responsive to said first vehicle speed signals and said clock frequency signal for generating second vehicle speed signals having a frequency which is two times that of said first vehicle speed signals.

5. An apparatus according to claim 3, wherein said initial speed measuring means includes:

an initial speed signal gating circuit operable to open at predetermined intervals for a time interval required to count a desired number of said clock frequency signals from said clock signal generating circuit so as to pass a number of said second vehicle speed signals indicative of the speed per hour of said vehicle;

second latch circuit means for counting and latching said second vehicle speed signals passed; and third latch circuit means responsive to said start-of-braking indication control signal for latching an output of said second latch circuit means.

6. An apparatus according to claim 3, wherein said final speed measuring means includes:

a final speed signal gating circuit responsive to said end-of-braking indication control signal so as to be opened for said time interval required for counting the desired number of said clock frequency signals so as to pass a number of said second vehicle speed signals indicative of the speed per hour of said vehicle; and fourth latch circuit means for counting said second vehicle speed signals passed so as to latch the count value thereof in response to closing of said final speed signal gating circuit.

7. A braking vehicle speed measuring apparatus comprising:

brake switch signal waveform reshaping means operatively connected to the brakes of a vehicle to generate a start-of-braking signal and an end-of-braking signal;

control signal generating means including clock signal generating means for generating a clock signal, first latch means responsive to said clock signal and said start-of-braking signal for generating an initial speed latch signal, and inverter means responsive to said end-of-braking signal for generating a final speed measurement start signal;

vehicle speed signal waveform reshaping means including vehicle speed signal sensor means connected to a speedometer cable shaft of said vehicle to generate and reshape rotational speed pulse signals, and frequency multiplier means responsive to said clock signal for doubling the frequency of said rotational speed pulse signals;

initial speed measuring means including first gate means for passing a number of said doubled pulse signals indicative of the speed per hour of said vehicle at predetermined intervals, first counter means for opening said first gate means for a time interval during which a desired number of said clock signals is counted, second counter means responsive to a count output of said first counter means for counting a predetermined number of said high-frequency clock signals to reset said first counter means, BCD counter means operable to count said pulse signals passed and responsive to said resetting to reset the count value thereof, and data latch means responsive to said initial speed latch signal to latch said count value;

final speed measuring means including second gate means responsive to said final speed measurement start signal to pass a number of said doubled pulse signals indicative of the speed per hour of said vehicle, third counter means for opening said second gate means until a desired number of said clock signals is counted after the receipt of said final speed measurement start signal, final speed counting means for counting and latching said pulse signals passed through said second gate means, and fourth counter means responsive to the opening of said second gate means to count said clock signals and generate a latch signal and a reset signal for controlling said final speed counter means; and indicator means for decoding and digitally indicating outputs of said initial speed measuring means and said final speed measuring means.

* * * * *

UNITED STATES PATENT AND TRADEMARK OFFICE
CERTIFICATE OF CORRECTION

PATENT NO. : 4,337,651

DATED : July 6, 1982

INVENTOR(S) : Yasuhisa YOSHINO, Akira KUNO, Hidetoshi SHIMIZU & Harumasa MINEGISHI It is certified that error appears in the above—identified patent and that said Letters Patent is hereby corrected as shown below:

On the Title page re Priority Data [Item 30]

December 6, 1979 [JP] Japan.....54-169435 should read

--December 6, 1979 [JP] Japan.....54-169435(U)--

Signed and Sealed this

*Eighteenth* Day of *January 1983*

[SEAL]

*Attest:*

GERALD J. MOSSINGHOFF

*Attesting Officer* *Commissioner of Patents and Trademarks*